US012589740B2

(12) United States Patent (10) Patent No.: US 12,589,740 B2
Pfau (45) Date of Patent: *Mar. 31, 2026

(54) CONTROLLER AND CONTROL METHOD FOR LEAN VEHICLE

(71) Applicant: Robert Bosch GmbH, Stuttgart (DE)

(72) Inventor: Lars Pfau, Kanagawa (JP)

(73) Assignee: Robert Bosch GmbH, Stuttgart (DE)

( * ) Notice: Subject to any disclaimer, the term of this patent is extended or adjusted under 35 U.S.C. 154(b) by 12 days.

This patent is subject to a terminal disclaimer.

(21) Appl. No.: 18/722,698

(22) PCT Filed: Dec. 12, 2022

(86) PCT No.: PCT/IB2022/062041
§ 371 (c)(1),
(2) Date: Jun. 21, 2024

(87) PCT Pub. No.: WO2023/119051
PCT Pub. Date: Jun. 29, 2023

(65) Prior Publication Data
US 2025/0050961 A1 Feb. 13, 2025

(30) Foreign Application Priority Data
Dec. 23, 2021 (JP) ................................. 2021-209388

(51) Int. Cl.
*B60W 30/09* (2012.01)
*B60W 30/095* (2012.01)
(Continued)

(52) U.S. Cl.
CPC ........ *B60W 30/09* (2013.01); *B60W 30/0956* (2013.01); *B60W 30/16* (2013.01);
(Continued)

(58) Field of Classification Search
None
See application file for complete search history.

(56) References Cited

U.S. PATENT DOCUMENTS 9,616,955 B2 * 4/2017 May ........................... B62J 9/24
11,884,351 B2 * 1/2024 Seguin ..................... B62H 1/00
(Continued)

FOREIGN PATENT DOCUMENTS

CN 112298422 A * 2/2021 .............. B62J 43/16
CN 118457788 A * 8/2024 .............. F02D 43/00
(Continued)

OTHER PUBLICATIONS

International Search Report and Written Opinion for Application No. PCT/IB2022/062041 dated Mar. 1, 2023 (8 pages).

*Primary Examiner* — Kevin R Steckbauer
(74) *Attorney, Agent, or Firm* — Michael Best & Friedrich LLP

(57) ABSTRACT

The present invention obtains a controller and a control method capable of appropriately assisting with a rider.
An acquisition section of a controller (20) for a lean vehicle (100) acquires side case information as information on a side case (60) that is attached to the lean vehicle (100) and constitutes a part of the lean vehicle (100) on the basis of output of an environment information detection system (11) that includes at least one environment sensor (11*a*, 11*b*, 11*c*, 11*d*) that is mounted to the lean vehicle (100), and detects information on an object located around the lean vehicle (100), and an execution section of the controller (20) executes assistance operation for a rider (200) of the lean vehicle (100) on the basis of the side case information.

15 Claims, 3 Drawing Sheets

(51) Int. Cl.

| | |
|---|---|
| *B60W 30/16* | (2020.01) |
| *B60W 50/14* | (2020.01) |
| *B62J 27/00* | (2020.01) |
| *B62J 45/20* | (2020.01) |
| *B62J 45/41* | (2020.01) |
| *B62J 50/21* | (2020.01) |

(52) U.S. Cl.
CPC .............. *B60W 50/14* (2013.01); *B62J 27/00* (2013.01); *B62J 45/20* (2020.02); *B62J 45/41* (2020.02); *B62J 50/21* (2020.02)

(56) References Cited

U.S. PATENT DOCUMENTS

| | | | | |
|---|---|---|---|---|
| 12,110,036 | B2 * | 10/2024 | Pfau | G08G 1/162 |
| 2008/0169323 | A1 * | 7/2008 | Deitrich | B62K 11/00 |
| | | | | 224/413 |
| 2009/0014486 | A1 * | 1/2009 | Humphreys | B62J 7/04 |
| | | | | 224/430 |
| 2015/0232143 | A1 * | 8/2015 | May | B62K 3/02 |
| | | | | 280/202 |
| 2022/0176979 | A1 * | 6/2022 | Pfau | B60W 50/04 |
| 2023/0256987 | A1 * | 8/2023 | Pfau | G08G 1/166 |
| | | | | 340/425.5 |
| 2024/0034428 | A1 * | 2/2024 | Pfau | G08G 1/096725 |
| 2024/0217610 | A1 * | 7/2024 | Pfau | B62J 50/22 |
| 2025/0050961 | A1 * | 2/2025 | Pfau | B62J 45/20 |

FOREIGN PATENT DOCUMENTS

| | | | | | |
|---|---|---|---|---|---|
| DE | 102013209873 | A1 | | 12/2014 | |
| DE | 102021000737 | B3 | * | 1/2022 | ............. B62J 45/41 |
| EP | 4174820 | A1 | * | 5/2023 | ............. B60Q 1/346 |
| EP | 4454964 | A1 | * | 10/2024 | ............. B62J 50/21 |
| EP | 4456034 | A1 | * | 10/2024 | ....... G08G 1/096775 |
| JP | 2009116882 | A | | 5/2009 | |
| JP | 2022096468 | A | * | 6/2022 | ........... B60T 8/3225 |
| JP | 2023175515 | A | * | 12/2023 | |
| JP | 2024090302 | A | * | 7/2024 | |
| JP | 7561212 | B2 | * | 10/2024 | ......... B60W 30/143 |
| JP | 7592895 | B2 | * | 12/2024 | ............. B62J 50/21 |
| KR | 20220142227 | A | * | 10/2022 | .......... G08G 1/0125 |
| TW | I842096 | B | * | 5/2024 | ............... B62J 1/00 |
| WO | WO-2017103311 | A1 | * | 6/2017 | ............. B62J 7/08 |
| WO | 2021094877 | A1 | | 5/2021 | |
| WO | 2021111224 | A1 | | 6/2021 | |
| WO | WO-2023119051 | A1 | * | 6/2023 | ............. B62J 50/21 |
| WO | WO-2024201726 | A1 | * | 10/2024 | ............. G08G 1/16 |

* cited by examiner

[FIG. 1]
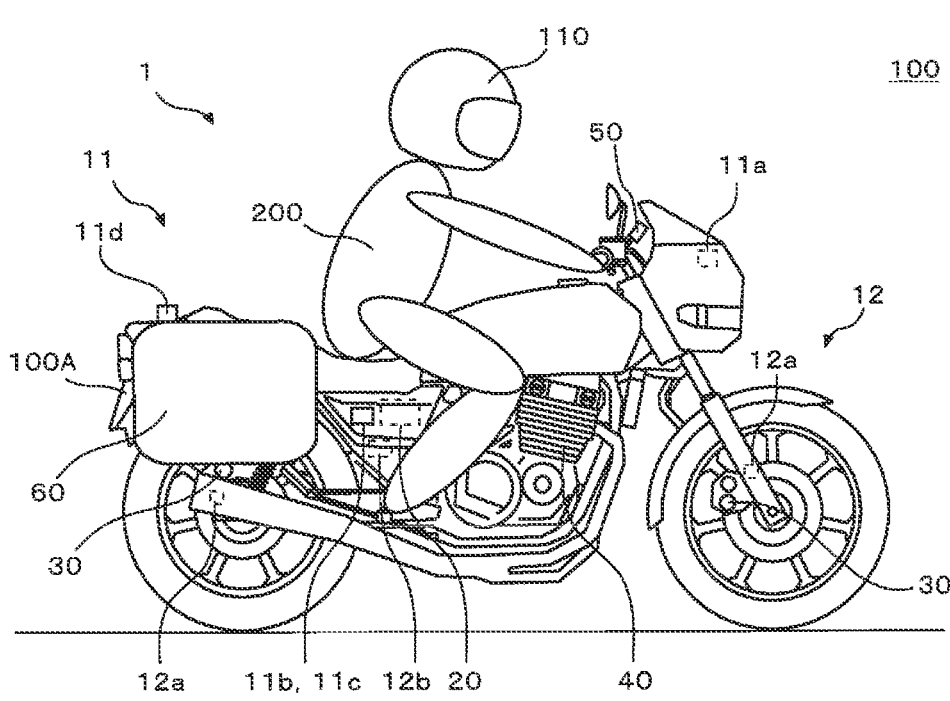
[FIG. 2]
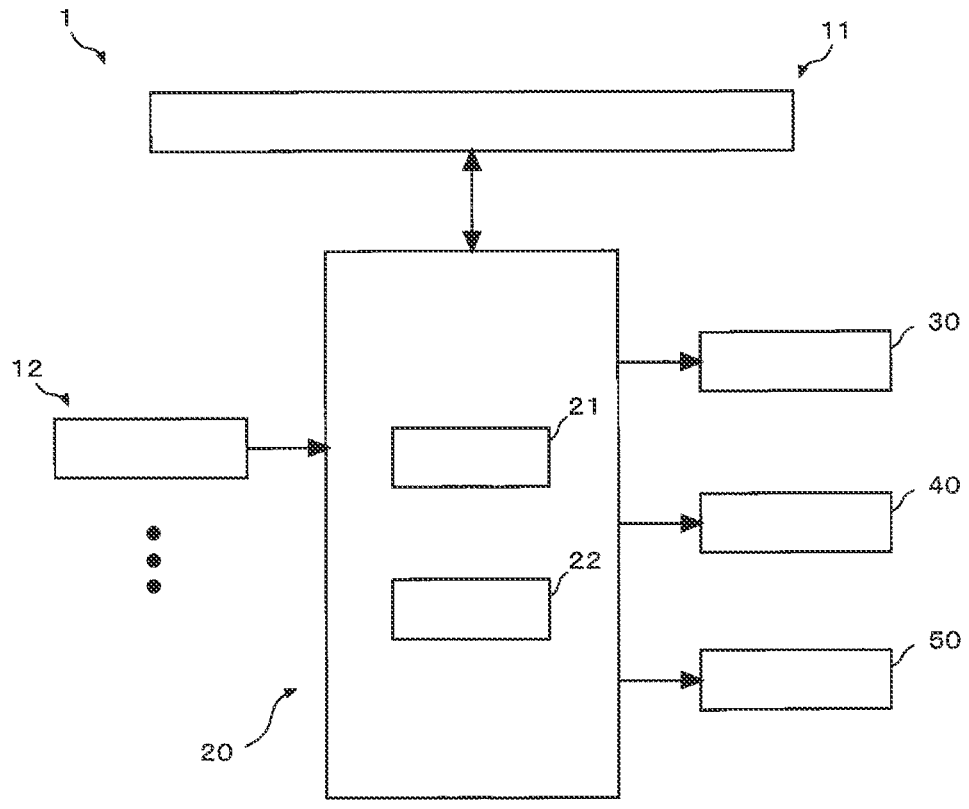

[FIG. 3]
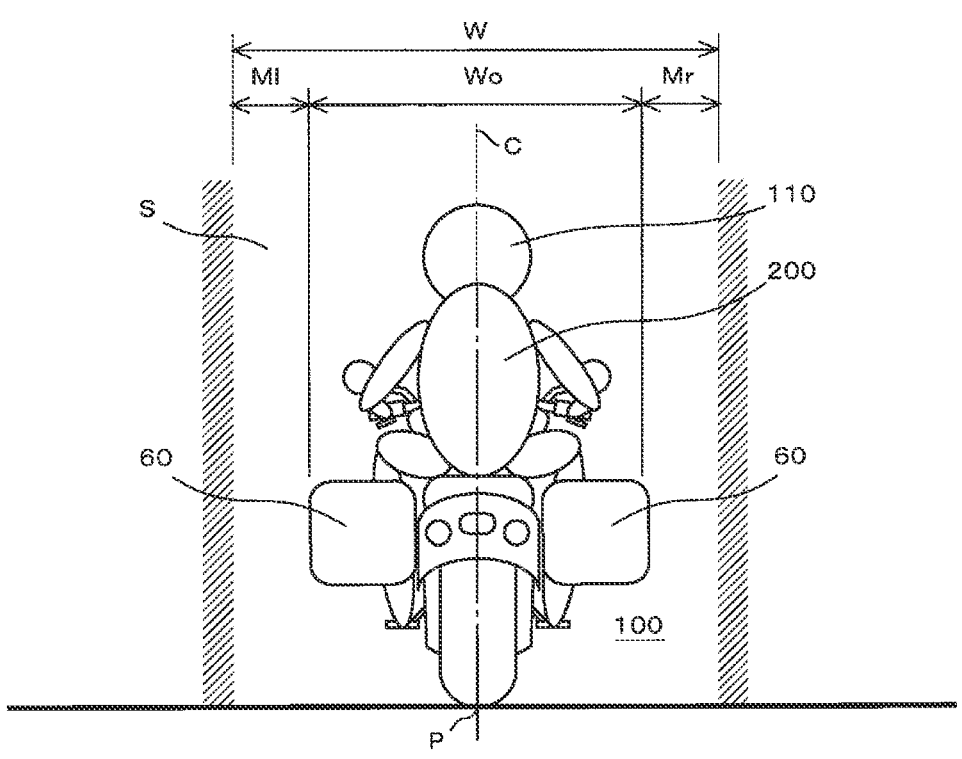
[FIG. 4]
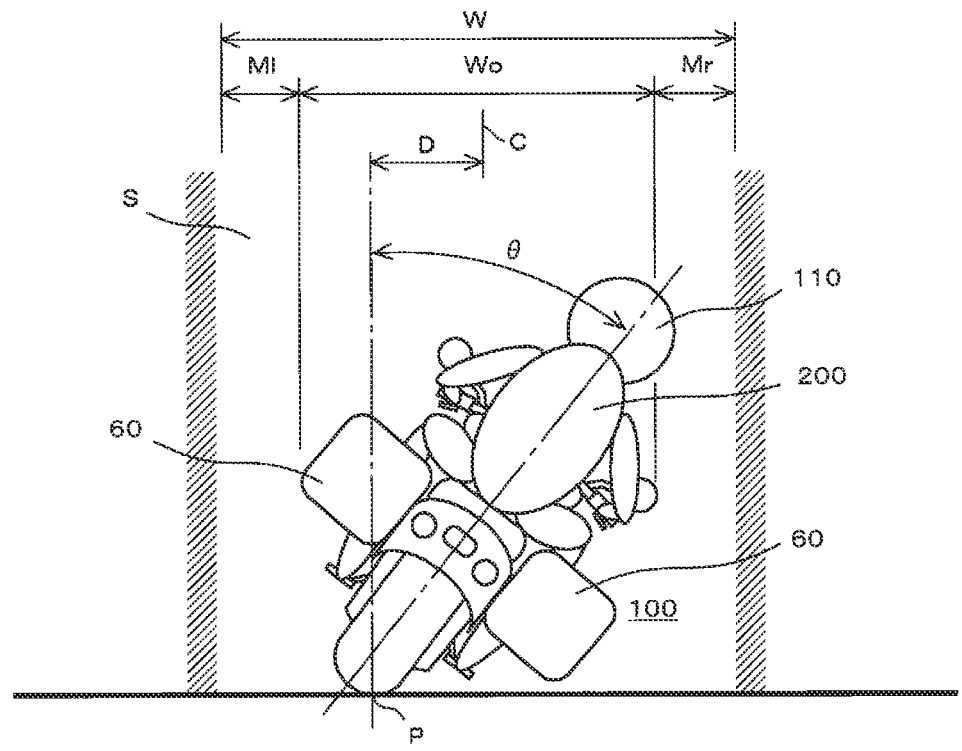

[FIG 5]
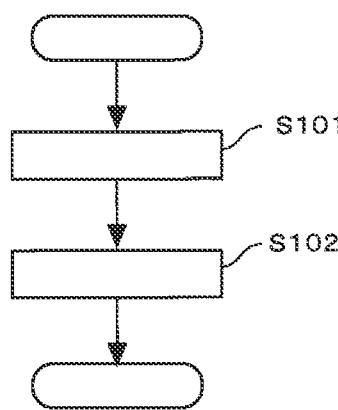

CONTROLLER AND CONTROL METHOD FOR LEAN VEHICLE

BACKGROUND

The present invention relates to a controller for a lean vehicle and a control method for a lean vehicle.

As a conventional controller for a lean vehicle, a controller that executes assistance operation for a rider has been known (for example, JP2009-116882A).

SUMMARY

Unlike other vehicles (for example, a passenger car, a truck, and the like), a lean vehicle can be equipped with a side case. However, the conventional controller for a lean vehicle cannot acquire information on the side case and thus may be difficult to execute appropriate assistance operation.

The present invention has been made with the above-described problem as the background and therefore obtains a controller capable of appropriately assisting with a rider. The present invention also obtains a control method capable of appropriately assisting with the rider.

A controller according to the present invention is a controller for a lean vehicle and includes: an acquisition section that acquires side case information as information on a side case, which is attached to the lean vehicle and constitutes a part of the lean vehicle, on the basis of output of an environment information detection system that includes at least one environment sensor mounted to the lean vehicle and detects information on an object located around the lean vehicle; and an execution section that executes assistance operation for a rider of the lean vehicle on the basis of the side case information.

A control method according to the present invention is a control method for a lean vehicle and includes: acquiring side case information as information on a side case, which is attached to the lean vehicle and constitutes a part of the lean vehicle, by an acquisition section of a controller for the lean vehicle on the basis of output of an environment information detection system including at least one environment sensor mounted to the lean vehicle and detects information on an object located around the lean vehicle; and executing assistance operation for a rider of the lean vehicle by an execution section of the controller on the basis of the side case information.

In the controller and the control method according to the present invention, the information on the side case is acquired on the basis of the output of the environment information detection system, and the assistance operation for the rider of the lean vehicle is executed on the basis of the information on the side case. Accordingly, it is possible to appropriately acquire the information on the side case. Therefore, it is possible to appropriately assist with the rider.

BRIEF DESCRIPTION OF THE DRAWINGS

FIG. 1 is a view illustrating a mounted state of an assistance system according to an embodiment of the present invention to a lean vehicle.

FIG. 2 is a diagram illustrating a configuration of the assistance system according to the embodiment of the present invention.

FIG. 3 is a view for explaining automatic acceleration/deceleration operation and collision suppression operation by the assistance system according to the embodiment of the present invention in a state where the lean vehicle traveling in an upright posture is seen from behind.

FIG. 4 is a view for explaining the automatic acceleration/deceleration operation and the collision suppression operation by the assistance system according to the embodiment of the present invention in a state where the lean vehicle traveling in a leaning posture is seen from behind.

FIG. 5 is a chart illustrating an example of an operation flow of a controller in the assistance system according to the embodiment of the present invention.

DETAILED DESCRIPTION

A description will hereinafter be made on a controller and a control method according to the present invention with reference to the drawings.

A configuration, operation, and the like, which will be described below, merely constitute one example, and the controller and the control method according to the present invention are not limited to a case with such a configuration, such operation, and the like.

For example, a description will hereinafter be made on a case where the controller and the control method according to the present invention are applied to a two-wheeled motorcycle. However, the controller and the control method according to the present invention may be applied to a lean vehicle other than the two-wheeled motorcycle. The lean vehicle means a vehicle in general that travels in a leaning state in a turning direction during a turn. Examples of the lean vehicle are the two-wheeled motorcycle, a three-wheeled motorcycle, and a pedal-driven vehicle. The motor-cycles include a vehicle that has an engine as a propelling source, a vehicle that has an electric motor as the propelling source, and the like. Examples of the motorcycle are a bike, a scooter, and an electric scooter. The pedal-driven vehicle means a vehicle in general that can travel forward on a road by a depression force applied to pedals by a rider. Examples of the pedal-driven vehicle are a normal pedal-driven vehicle, an electrically-assisted pedal-driven vehicle, and an electric pedal-driven vehicle.

The same or similar description will appropriately be simplified or will not be made below. In the drawings, the same or similar portions will be denoted by the same reference sign or will not be denoted by a reference sign. A detailed structure will appropriately be illustrated in a simplified manner or will not be illustrated.

Embodiment

A description will hereinafter be made on an assistance system according to an embodiment.

Configuration of Assistance System

A description will be made on a configuration of the assistance system according to the embodiment.

FIG. 1 is a view illustrating a mounted state of the assistance system according to the embodiment of the present invention to a lean vehicle. FIG. 2 is a diagram illustrating a configuration of the assistance system according to the embodiment of the present invention.

As illustrated in FIG. 1 and FIG. 2, an assistance system 1 is mounted to a lean vehicle 100. The assistance system 1 at least includes: an environment information detection system 11 for detecting environment information of the lean vehicle 100; a travel state information detection system 12 for detecting travel state information of the lean vehicle 100; and a controller (ECU) 20. The assistance system 1 assists with a rider 200 of the lean vehicle 100. The controller 20 receives detection results by various systems (not illustrated) for detecting other types of information (for example, information on a brake operation by the rider 200, information on an accelerator operation by the rider 200, and the like) when necessary. Each section of the assistance system 1 may exclusively be used for the assistance system 1 or may be shared with any of the other systems.

For example, the environment information detection system 11 includes: at least one environment sensor 11*a* that faces a front side of the lean vehicle 100; at least one environment sensor 11*b* that faces a right side of the lean vehicle 100; at least one environment sensor 11*c* that faces a left side of the lean vehicle 100; and at least one environment sensor 11*d* that faces a rear side of the lean vehicle 100. In FIG. 1, the environmental sensor 11*c* is illustrated in a manner to be located on a near side of the sheet. However, in reality, the environmental sensor 11*c* is located on a far side of the sheet. The environment sensors 11*a*, 11*b*, 11*c*, 11*d* are mounted to the lean vehicle 100. For example, each of the environment sensors 11*a*, 11*b*, 11*c*, 11*d* is an ultrasonic sensor, a radar, a Lidar sensor, a camera, or the like. Each of the environment sensors 11*a*, 11*b*, 11*c*, 11*d* may detect information on a distance to and/or a direction (for example, a relative position, a relative distance, a relative speed, relative acceleration, a relative jerk, a passing time difference, a predicted time until a collision, or the like) of an object (for example, a vehicle, an obstacle, a road facility, a person, an animal, or the like) located within a detection range in a non-contact manner. Alternatively, each of the environment sensors 11*a*, 11*b*, 11*c*, 11*d* may detect a characteristic of the object (for example, a type of the object, a shape of the object, a mark on the object, or the like) located within the detection range in the non-contact manner. That is, the environment information detection system 11 detects the information on the object located around the lean vehicle 100 as the environment information by using the environment sensors 11*a*, 11*b*, 11*c*, 11*d*. At least one environment sensor of the environment sensors 11*a*, 11*b*, 11*c*, 11*d* may serve as another environment sensor. When necessary, at least one of the environment sensors 11*a*, 11*b*, 11*c*, 11*d* may not be provided, or another sensor may be added.

For example, the travel state information detection system 12 includes a wheel rotational frequency sensor 12*a* and an inertial sensor (IMU) 12*b*. The wheel rotational frequency sensor 12*a* detects a rotational frequency of a wheel of the lean vehicle 100. The wheel rotational frequency sensor 12*a* may detect another physical quantity that can substantially be converted to the rotational frequency of the wheel of the lean vehicle 100. The inertial sensor 12*b* detects three-axis acceleration and three-axis (roll, pitch, and yaw) angular velocities generated to the lean vehicle 100. The inertial sensor 12*b* may detect other physical quantities that can substantially be converted to the three-axis acceleration and the three-axis angular velocities generated to the lean vehicle 100. Alternatively, the inertial sensor 12*b* may partially detect the three-axis acceleration and the three-axis angular velocities. Further alternatively, when necessary, at least one of the wheel rotational frequency sensor 12*a* and the inertial sensor 12*b* may not be provided, or another sensor may be added.

The controller 20 at least includes an acquisition section 21 and an execution section 22. The sections of the controller 20 may collectively be provided in a single casing or may separately be provided in plural casings. In addition, the controller 20 may partially or entirely be constructed of a microcomputer, a microprocessor unit, or the like, may be constructed of one whose firmware and the like can be updated, or may be a program module or the like that is executed by a command from a CPU or the like, for example.

The acquisition section 21 acquires side case information on the basis of output of the environment information detection system 11. The side case information is information on a side case 60 that is detachably attached to the lean vehicle 100. For example, in a state of being projected in a vehicle width direction of the lean vehicle 100, the side case 60 is attached to a body of the lean vehicle 100. For example, the side case 60 can accommodate luggage and the like. In a state of being attached to the lean vehicle 100, the side case 60 constitutes a part of the lean vehicle 100. In addition, the acquisition section 21 acquires the travel state information of the lean vehicle 100 on the basis of output of the travel state information detection system 12.

For example, in the case where the environment sensor 11*b* and/or the environment sensor 11*c*, that is, the environment sensor, which is assumed to face a position where the side case 60 is present (for example, a lateral side of a rear fender 100A, or the like) when the side case 60 in a standard size is attached to a standard position in the lean vehicle 100, cannot detect a close range, the acquisition section 21 determines whether all or a part of a field of view of the environment sensor 11*b* and/or the environment sensor 11*c* cannot be detected on the basis of the output of the environment information detection system 11. That is, the acquisition section 21 acquires information on detectability by the environment sensor 11*b* and/or the environment sensor 11*c*. In the case where the determination remains positive beyond a reference time or a reference travel distance, the acquisition section 21 determines that the side case 60 is present. That is, the side case information includes information on presence or absence of the side case 60. In addition, in the case where the determination remains positive beyond the reference time or the reference travel distance, the acquisition section 21 estimates an attachment position of the side case 60 by using information on a relative position of the field of view of the environment sensor 11*b* and/or the environment sensor 11*c* to the lean vehicle 100. For example, in the case where the environment sensor 11*b* is not detectable but the environment sensor 11*c* is detectable, the acquisition section 21 estimates that the side case 60 is only attached to a right side of the lean vehicle 100. Alternatively, for example, in the case where the field of view of the environment sensor 11*b* cannot partially be detected or only some of the plural environment sensors 11*b* are in an undetectable state, the acquisition section 21 estimates the attachment position of the side case 60 by using information on a relative position of an undetectable area to the lean vehicle 100. That is, the side case information includes information on the position of the side case 60. Further alternatively, in the case where the determination remains positive beyond the reference time or the reference travel distance, the acquisition section 21 estimates a size of the attached side case 60 by using the information on the relative position of the field of view of the environment sensor 11*b* and/or the environment sensor 11*c* to the lean vehicle 100. For example, in the case where the field of view of the environment sensor 11*b* cannot partially be detected or only some of the plural environment sensors 11*b* are in the undetectable state, the acquisition section 21 estimates the size of the attached side case 60 by using the information on the relative position of the undetectable area to the lean vehicle 100. That is, the side case information includes information on the size of the side case 60.

For example, in the case where the environment sensor 11*b* and/or the environment sensor 11*c,* that is, the environment sensor, which is assumed to face the position where the side case 60 is present (for example, the lateral side of the rear fender 100A, or the like) when the side case 60 in the standard size is attached to the standard position in the lean vehicle 100, can detect the close range, the acquisition section 21 determines whether a certain object, that is, the side case 60 exists at a position, a distance of which from the environment sensor 11*b* or the environment sensor 11*c* falls below a reference distance and/or a position, a direction of which from the environment sensor 11*b* or the environment sensor 11*c* falls within a reference range on the basis of the output of the environment information detection system 11. That is, the acquisition section 21 acquires information on the distance and/or the direction from the environment sensor 11*b* or the environment sensor 11*c* to the side case 60. In the case where the determination remains positive beyond the reference time or the reference travel distance, the acquisition section 21 determines that the side case 60 is present. That is, the side case information includes the information on the presence or the absence of the side case 60. In addition, in the case where the determination remains positive beyond the reference time or the reference travel distance, the acquisition section 21 estimates the attachment position and/or the size of the side case 60 by using the information on the distance and/or the direction from the environment sensor 11*b* or the environment sensor 11*c* to the object, that is, the side case 60. That is, the side case information includes the information on the position and/or the size of the side case 60.

At least one of the environment sensor 11*b* and the environment sensor 11*c* may exclusively be used to acquire the side case information, or may also be used to determine a collision possibility of the object, which is located on a lateral side of the lean vehicle 100, against the lean vehicle 100 in collision suppression operation, which will be described below. Alternatively, in the case where the environment sensor 11*a* or the environment sensor 11*d* has the wide field of view, at least one of the environment sensor 11*b* and the environment sensor 11*c* may be substituted by the environment sensor 11*a* or the environment sensor 11*d*. In particular, the environment sensor for acquiring the side case information is preferably the ultrasonic sensor. In such a case, the ultrasonic sensor may detect distance information and/or quality characteristic information (for example, an amplitude, a correlation coefficient, a frequency, or the like) included in a reflected wave in order to acquire the side case information, may detect a noise level, or may detect ground clutter.

The execution section 22 executes assistance operation for the rider 200 on the basis of the side case information that is acquired by the acquisition section 21. For example, the execution section 22 executes the assistance operation for the rider 200 by outputting control commands to a brake system 30 that generates a braking force to the lean vehicle 100, a drive system 40 that generates drive power to the lean vehicle 100, a notification device 50 that issues notification to the rider 200 (for example, notification that acts on an auditory organ, notification that acts on a visual organ, notification that acts on a sensory organ, or the like), and the like. That is, as the assistance operation for the rider 200, the execution section 22 may execute behavior control operation of the lean vehicle 100 or may execute notification operation to the rider 200. The notification device 50 may be provided to the lean vehicle 100 or may be provided to a worn article 110 (for example, a helmet, goggles, gloves, or the like) by the rider 200. Such a worn article 110 is communicatively connected to the lean vehicle 100. In addition, the notification to the rider 200 may be issued by haptic motion that causes an instantaneous reduction or increase in the acceleration/deceleration of the lean vehicle 100. In such a case, the brake system 30 or the drive system 40 implements the function of the notification device 50.

As a specific example, the execution section 22 executes, as the notification operation, operation to notify the rider 200 that the side case 60 is attached to the lean vehicle 100. In addition, the execution section 22 executes, as the notification operation, operation to notify the rider 200 of the attachment position of the side case 60. Furthermore, the execution section 22 executes, as the notification operation, operation to notify the rider 200 of the size of the attached side case 60.

As another specific example, the execution section 22 executes, as the behavior control operation, operation to change a mode of slip control (for example, anti-lock brake control, traction control, sideslip suppression control, or the like) and/or suspension control for the lean vehicle 100 according to the presence or the absence of the side case 60. In the case where the side case information is information indicating that the side case 60 is attached, the execution section 22 assumes that the lean vehicle 100 is loaded at the rear, and automatically sets a mode in which a threshold value specific to such a state is set. The execution section 22 preferably reflects weight of the standard side case 60 and/or weight of a standard content, which is assumed from the size of the side case 60, to the setting of the mode. In addition, the execution section 22 preferably reflects the information on the attachment position of the side case 60 to the setting of the mode. Here, the execution section 22 may execute, as the notification operation, operation to suggest to the rider 200 to change the mode, and may confirm the mode change after the rider 200 approves the mode change.

As further another specific example, the execution section 22 executes the assistance operation for the rider 200 on the basis of, in addition to the side case information, positional relationship information between the lean vehicle 100 and the object (for example, the vehicle, the obstacle, the road facility, the person, the animal, or the like) that is located around the lean vehicle 100. The acquisition section 21 acquires the positional relationship information on the basis of the output of the environment information detection system 11. For example, the positional relationship information is information on the relative position, the relative distance, the relative speed, the relative acceleration, the relative jerk, the passing time difference, the predicted time until the collision, or the like. The positional relationship information may be information on another physical quantity that can substantially be converted to respective one of those. In order to acquire the positional relationship information, a different environment sensor from the environment sensor used to acquire the side case information may be used, or the environment sensor used to acquire the side case information may be used.

For example, the execution section 22 executes, as the assistance operation for the rider 200, automatic acceleration/deceleration operation of the lean vehicle 100 on the basis of the positional relationship information that is acquired by the acquisition section 21. For example, the automatic acceleration/deceleration operation is speed following control (so-called adaptive cruise control) for a preceding vehicle, which is executed in a state where the brake operation or the accelerator operation is not performed by the rider 200, the speed following control for the preceding vehicle, which is executed in a state where the brake operation or the accelerator operation is performed by the rider 200, or the like. The acquisition section 21 acquires the information on the relative distance, the relative speed, or the passing time difference between the lean vehicle 100 and the preceding vehicle of the lean vehicle 100, that is, the object as a speed following target. The execution section 22 outputs the control command to the brake system 30 or the drive system 40, causes generation of the acceleration/deceleration to the lean vehicle 100 according to the information on the relative distance, the relative speed, or the passing time difference, and thereby causes the lean vehicle 100 to follow the preceding vehicle at the same speed. The brake system 30 may be controlled to generate or increase the deceleration or may be controlled to generate or increase the acceleration. The drive system 40 may be controlled to generate or increase the acceleration or may be controlled to generate or increase the deceleration. When executing the automatic acceleration/deceleration operation, the execution section 22 outputs a control signal to the notification device 50 and issues the notification to the rider 200 when necessary. For example, as will be described below, the execution section 22 estimates a road width Wo that is occupied by travel of the lean vehicle 100 on the basis of the side case information, and changes the automatic acceleration/deceleration operation according to a result of the estimation.

For example, the execution section 22 executes, as the assistance operation for the rider 200, the collision suppression operation of the lean vehicle 100 on the basis of the positional relationship information that is acquired by the acquisition section 21. The acquisition section 21 acquires the information on the predicted time until the collision, that is, the information on the collision possibility between the lean vehicle 100 and the object (for example, the vehicle, the obstacle, the road facility, the person, the animal, or the like) that is located around (for example, in front of, on a right side, on a left side, behind, or the like) the lean vehicle 100. In the case where it is determined that the collision possibility exceeds a reference, the execution section 22 outputs the control signal to the notification device 50 and causes the notification device 50 to issue the notification to the rider 200. In addition, in the case where it is determined that the collision possibility exceeds the reference, the execution section 22 outputs the control command to the brake system 30 or the drive system 40 and causes the brake system 30 or the drive system 40 to generate the acceleration/deceleration to the lean vehicle 100, so as to prevent the collision. The brake system 30 may be controlled to generate or increase the deceleration or may be controlled to generate or increase the acceleration. The drive system 40 may be controlled to generate or increase the acceleration or may be controlled to generate or increase the deceleration. For example, as will be described below, the execution section 22 estimates the road width Wo that is occupied by the travel of the lean vehicle 100 on the basis of the side case information, and changes the collision suppression operation according to the result of the estimation.

A description will hereafter be made on a method for estimating the road width Wo that is occupied by the travel of the lean vehicle 100 as well as the automatic acceleration/deceleration operation and the collision suppression operation using the result of the estimation with reference to FIG. 3 and FIG. 4.

FIG. 3 is a view for explaining the automatic acceleration/deceleration operation and the collision suppression operation by the assistance system according to the embodiment of the present invention in a state where the lean vehicle traveling in an upright posture is seen from behind. FIG. 4 is a view for explaining the automatic acceleration/deceleration operation and the collision suppression operation by the assistance system according to the embodiment of the present invention in a state where the lean vehicle traveling in a leaning posture is seen from behind.

When executing the automatic acceleration/deceleration operation, the execution section 22 acquires a future trajectory of a travel position P of the lean vehicle 100 on the basis of the travel state information of the lean vehicle 100 that is acquired by the acquisition section 21. Then, the execution section 22 sets an area where the future trajectory is expanded in a width direction as a road area S where the travel of the lean vehicle 100 is assumed. When executing the automatic acceleration/deceleration operation, the execution section 22 selects the object that is located in the road area S, that is, the preceding vehicle as the speed following target. That is, when executing the automatic acceleration/deceleration operation, the execution section 22 does not select the object that is not located in the road area S, that is, the preceding vehicle as the speed following target. In addition, when executing the collision suppression operation, the execution section 22 selects the object (for example, the vehicle, the obstacle, the road facility, the person, the animal, or the like) that is located in the road area S as a determination target for the collision possibility. That is, when executing the collision suppression operation, the execution section 22 does not select the object that is not located in the road area S as the determination target for the collision possibility. The execution section 22 estimates the road width Wo that is occupied by the travel of the lean vehicle 100 on the basis of the side case information, and sets the road area S on the basis of the road width Wo.

As illustrated in FIG. 3 and FIG. 4, the road width Wo that is occupied by the travel of the lean vehicle 100 is defined as a distance between a left end and a right end of the lean vehicle 100 in a direction that is parallel to a road surface and is orthogonal to an advancing direction of the lean vehicle 100. For example, as illustrated in FIG. 3, in the state where the lean vehicle 100 travels in the upright posture, in the case where the side case information is the information indicating that the side case 60 is attached, the execution section 22 estimates the road width Wo in consideration of the information on the size of the standard side case 60 in addition to information on the size of each section of the lean vehicle 100 in a state where the side case 60 is not attached. In addition, for example, as illustrated in FIG. 4, in the state where the lean vehicle 100 travels in the leaning posture, the execution section 22 estimates the greater road width Wo as a bank angle θ is increased. That is, the execution section 22 estimates the road width Wo on the basis of travel posture information as information on a travel posture of the lean vehicle 100, in addition to the side case information. In the case where the side case information includes the information on the attachment position of the side case 60 and/or the information on the size of the attached side case 60, the execution section 22 preferably estimates the road width Wo in consideration of such information. The execution section 22 sets an area where a right margin Mr and a left margin Ml are added to the road width Wo as the road area S where the travel of the lean vehicle 100 is assumed. Each of the right margin Mr and the left margin Ml may be set to the same value for the entire area in the advancing direction of the lean vehicle 100, or may be set to be increased as they go away from the lean vehicle 100 in the advancing direction of the lean vehicle 100. Here, the execution section 22 may set the road width Wo itself as the road area S where the travel of the lean vehicle 100 is assumed. In addition, in the example illustrated in FIG. 4, the execution section 22 may estimate the road width Wo in consideration of information on a standard seating height of the rider 200 or an actually measured seating height thereof. When setting the road area S, the execution section 22 preferably takes account of a displacement amount D of a center position C of the road width Wo with respect to the travel position P. The displacement amount D may depend on asymmetry in the vehicle width direction of the lean vehicle 100 or, as illustrated in FIG. 4, may depend on the bank angle θ.

The description has been made on the case where the execution section 22 estimates the road width Wo on the basis of the side case information and changes the assistance operation according to the result of the estimation. However, the execution section 22 may change the assistance operation without estimating the road width Wo. For example, in the automatic acceleration/deceleration operation and/or the collision suppression operation, the execution section 22 may change an upper limit value of the acceleration and/or an upper limit value of the deceleration generated to the lean vehicle 100 according to the presence or the absence, the position, and/or the size of the side case 60. Alternatively, in the collision suppression operation, the execution section 22 may change a criterion for the determination of the collision possibility according to the presence or the absence, the position, and/or the size of the side case 60. Further alternatively, the execution section 22 may output the control command to the environment information detection system 11 and change a direction of the field of view of each of the environment sensor 11b and the environment sensor 11c so as to exclude the side case 60 from the field of view. The execution section 22 may output a command to the acquisition section 21 and omit calculation processing for acquiring the positional relationship information between the lean vehicle 100 and the object located around the lean vehicle 100 in the undetectable area by the side case 60 or the area where the side case 60 is detected among data that is output from the environment information detection system 11. That is, the acquisition section 21 may acquire the positional relationship information with the object located in the area that is set according to the side case information of the area around the lean vehicle 100.

Operation of Assistance System

A description will be made on operation of the assistance system according to the embodiment.

FIG. 5 is a chart illustrating an example of an operation flow of the controller in the assistance system according to the embodiment of the present invention.

The controller 20 executes the operation flow illustrated in FIG. 5 during the travel of the lean vehicle 100.

Acquisition Step

In step S101, the acquisition section 21 acquires the side case information on the basis of the output of the environment information detection system 11. When necessary, the acquisition section 21 acquires the positional relationship information between the lean vehicle 100 and the object (for example, the vehicle, the obstacle, the road facility, the person, the animal, or the like) that is located around the lean vehicle 100 on the basis of the output of the environment information detection system 11. In addition, the acquisition section 21 acquires the travel state information of the lean vehicle 100 on the basis of the output of the travel state information detection system 12.

Execution Step

Next, in step S102, the execution section 22 executes the assistance operation for the rider 200 at least on the basis of the side case information that is acquired by the acquisition section 21.

Effects of Assistance System

A description will be made on effects of the assistance system according to the embodiment.

In the controller 20, the side case information is acquired on the basis of the output of the environment information detection system 11, and the assistance operation for the rider 200 of the lean vehicle 100 is executed on the basis of the side case information. Accordingly, it is possible to appropriately acquire the information on the side case 60. Therefore, it is possible to appropriately assist with the rider 200.

Preferably, the acquisition section 21 acquires the side case information on the basis of the information on the detectability by the environment sensor (for example, the environment sensor 11b, the environment sensor 11c, or the like). In addition, preferably, the acquisition section 21 acquires the side case information on the basis of the information on the distance and/or the direction from the environment sensor (for example, the environment sensor 11b, the environment sensor 11c, or the like) to the side case 60. With those configurations, it is possible to appropriately acquire the information on the side case 60.

Preferably, the acquisition section 21 acquires the positional relationship information between the lean vehicle 100 and the object on the basis of the output of the environment information detection system 11, and then the execution section 22 executes the assistance operation on the basis of the positional relationship information in addition to the side case information. With such a configuration, it is possible to appropriately assist with the rider 200. In particular, the execution section 22 may estimate the road width Wo that is occupied by the travel of the lean vehicle 100 on the basis of the side case information, and may change the assistance operation according to the result of the estimation. With such a configuration, it is possible to appropriately assist with the rider 200.

REFERENCE SIGNS LIST

1: Assistance system
11: Environment information detection system
11a, 11b, 11c, 11d: Environment sensor
12: Travel state information detection system
12a: Wheel rotational frequency sensor
12b: Inertial sensor
20: Controller
21: Acquisition section
22: Execution section
30: Brake system
40: Drive system
50: Notification device
60: Side case
100: Lean vehicle

100A: Rear fender
110: Worn article
200: Rider

The invention claimed is:

1. A controller (20) for a lean vehicle (100), the controller (20) configured to:

acquire side case information as information on a side case (60), which is attached to the lean vehicle (100) and constitutes a part of the lean vehicle (100), based on output of an environment information detection system (11) that includes at least one environment sensor (11$a$, 11$b$, 11$c$, 11$d$) mounted to the lean vehicle (100) and detects information on an object located around the lean vehicle (100); and execute assistance operation for a rider (200) of the lean vehicle (100) based on the side case information.

2. The controller (20) according to claim 1, wherein the controller (20) acquires, as the side case information, information on presence or absence of the side case (60).

3. The controller (20) according to claim 1, wherein the controller (20) acquires, as the side case information, information on a position of the side case (60).

4. The controller (20) according to claim 1, wherein the controller (20) acquires, as the side case information, information on a size of the side case (60).

5. The controller (20) according to claim 1, wherein the controller (20) acquires the side case information based on information on detectability by the environment sensor (11$a$, 11$b$, 11$c$, 11$d$).

6. The controller (20) according to claim 1, wherein the acquisition section (21) acquires the side case information on the basis of information on a distance and/or a direction from the environment sensor (11$a$, 11$b$, 11$c$, 11$d$) to the side case (60).

7. The controller (20) according to claim 1, wherein the assistance operation includes notification operation to the rider (200).

8. The controller (20) according to claim 1, wherein the assistance operation includes behavior control operation of the lean vehicle (100).

9. The controller (20) according to claim 1, wherein the controller (20) acquires positional relationship information between the lean vehicle (100) and the object on the basis of the output of the environment information detection system (11), and the controller (20) executes the assistance operation on the basis of the positional relationship information in addition to the side case information.

10. The controller (20) according to claim 9, wherein the controller (20) acquires the positional relationship information with the object located in an area that is set according to the side case information of an area around the lean vehicle (100).

11. The controller (20) according to claim 9, wherein the controller (20) estimates a road width (Wo) that is occupied by travel of the lean vehicle (100) on the basis of the side case information, and changes the assistance operation according to a result of the estimation.

12. The controller (20) according to claim 11, wherein the controller (20) estimates the road width (Wo) on the basis of travel posture information as information on a travel posture of the lean vehicle (100), in addition to the side case information.

13. The controller (20) according to claim 11, wherein the controller (20) changes the object as a speed following target in automatic acceleration/deceleration operation as the assistance operation according to the result of the estimation.

14. The controller (20) according to claim 11, wherein the controller (20) changes the object as a determination target for a collision possibility in collision suppression operation as the assistance operation according to the result of the estimation.

15. A control method for a lean vehicle (100), the control method comprising:

acquiring side case information as information on a side case (60), which is attached to the lean vehicle (100) and constitutes a part of the lean vehicle (100), via a controller (20) for the lean vehicle (100) based on output of an environment information detection system (11) that includes at least one environment sensor (11$a$, 11$b$, 11$c$, 11$d$) mounted to the lean vehicle (100) and detects information on an object located around the lean vehicle (100); and executing assistance operation for a rider (200) of the lean vehicle (100) via the controller (20) based on the side case information.

* * * * *